US012452647B2

(12) United States Patent
Thiebaut et al.

(10) Patent No.: US 12,452,647 B2
(45) Date of Patent: Oct. 21, 2025

(54) DYNAMICAL CHANGE IN ACCESS AND MOBILITY POLICY

(71) Applicant: NOKIA SOLUTIONS AND NETWORKS OY, Espoo (FI)

(72) Inventors: Laurent Thiebaut, Antony (FR); Yang Shen, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 531 days.

(21) Appl. No.: 17/910,207

(22) PCT Filed: Mar. 12, 2020

(86) PCT No.: PCT/CN2020/079074
§ 371 (c)(1),
(2) Date: Sep. 8, 2022

(87) PCT Pub. No.: WO2021/179272
PCT Pub. Date: Sep. 16, 2021

(65) Prior Publication Data
US 2023/0087243 A1    Mar. 23, 2023

(51) Int. Cl.
*H04W 8/22* (2009.01)
*H04W 48/14* (2009.01)
(Continued)

(52) U.S. Cl.
CPC ............. *H04W 8/22* (2013.01); *H04W 48/14* (2013.01); *H04W 48/16* (2013.01); *H04W 48/20* (2013.01); *H04W 60/04* (2013.01)

(58) Field of Classification Search
CPC ....... H04W 8/22; H04W 48/14; H04W 48/16; H04W 48/20; H04W 60/04; H04W 8/02
(Continued)

(56) References Cited

U.S. PATENT DOCUMENTS 8,982,838 B2 * 3/2015 Sun ................... H04W 36/0016
370/331
11,290,974 B2 * 3/2022 Yu ......................... H04W 76/16
(Continued)

FOREIGN PATENT DOCUMENTS

CN        110120879 A      8/2019
EP          2959722 B1 * 10/2018  ............ H04W 40/12
(Continued)

OTHER PUBLICATIONS

Extended European Search Report dated Jan. 30, 2024 corresponding to European Patent Application No. 20924433.4.
(Continued)

*Primary Examiner* — Mahendra R Patel
(74) *Attorney, Agent, or Firm* — Nokia Solutions and Networks Oy

(57) ABSTRACT

Embodiments of the present disclosure relate to dynamical changes in access and mobility policies. According to embodiments, an Application Function entity can request the Access and Mobility related entity to modify the access and mobility policies for a terminal device after the discovery of the Access and Mobility related entity. Alternatively, the Access and Mobility related entity obtains access and mobility policies from a User Data Repository that link traffic of an application on a Session towards to access and mobility policies and configure the AM policy based on a detection of traffic change done under control of a Session Management related entity. Therefore, the access setting and/or the mobility setting can be dynamically changed based on the traffic change in the application.

6 Claims, 10 Drawing Sheets

(51) Int. Cl.
*H04W 48/16* (2009.01)
*H04W 48/20* (2009.01)
*H04W 60/04* (2009.01)

(58) Field of Classification Search
USPC ..................................................... 455/435.1
See application file for complete search history.

(56) References Cited

U.S. PATENT DOCUMENTS

| | | | | |
|---|---|---|---|---|
| 11,632,734 | B2* | 4/2023 | Stojanovski | H04W 8/26 |
| | | | | 455/435.1 |
| 11,818,576 | B2* | 11/2023 | Sardesai | H04W 72/542 |
| 11,924,060 | B2* | 3/2024 | Smith | H04L 67/61 |
| 12,256,447 | B2* | 3/2025 | Sanchez Vega | H04L 69/16 |
| 2011/0170517 | A1* | 7/2011 | Bakker | H04W 36/125 |
| | | | | 370/328 |
| 2011/0171953 | A1* | 7/2011 | Faccin | H04W 48/08 |
| | | | | 455/426.1 |
| 2012/0239771 | A1* | 9/2012 | Rasanen | H04L 67/14 |
| | | | | 709/206 |
| 2016/0359750 | A1* | 12/2016 | Miklós | H04L 5/006 |
| 2018/0192471 | A1* | 7/2018 | Li | H04W 72/535 |
| 2020/0137675 | A1* | 4/2020 | Park | H04W 68/005 |
| 2020/0196375 | A1* | 6/2020 | Ryu | H04W 76/30 |
| 2020/0228936 | A1* | 7/2020 | Talebi Fard | H04W 4/08 |
| 2020/0267784 | A1* | 8/2020 | Bharatia | H04L 65/1016 |

FOREIGN PATENT DOCUMENTS

| | | | | |
|---|---|---|---|---|
| WO | WO-2007010340 | A1 * | 1/2007 | ............ H04W 64/00 |
| WO | WO-2011063853 | A1 * | 6/2011 | ......... H04L 65/1073 |
| WO | WO-2015160215 | A2 * | 10/2015 | ............ H04W 72/53 |
| WO | WO-2016140469 | A1 * | 9/2016 | ............. H04W 8/18 |
| WO | WO-2018215046 | A1 * | 11/2018 | ......... H04L 67/1021 |
| WO | WO-2019032972 | A1 * | 2/2019 | ............ H04W 76/16 |
| WO | WO-2019243872 | A1 * | 12/2019 | ............ H04W 72/56 |

OTHER PUBLICATIONS

Chinese Office Action and Search Report dated Jul. 5, 2023, corresponding to Chinese Patent Application No. 202080098328.5.
Adding Support for Delivering Background Data Transfer Polices to the UE,S2-1905368, Convida Wireless LLC, KDDI,3GPP TSG-SA2 Meeting #133.
International Search Report and Written Opinion dated Dec. 11, 2020 corresponding to International Patent Application No. PCT/CN2020/079074.
Convida Wireless LLC et al., "Adding Support for Delivering Background Data Transfer Policies to the UE," 62-1905368, 3GPP TSG-SA2 Meeting #133, Reno, NV, USA, May 17, 2019.
Nokia et al., "Multi PCF architecture for Dynamically changed AM policies in 5GC," S2-2003140, SA WG2 Meeting #S2-138E, Electronic Meeting, Apr. 24, 2020.
Communication pursuant to Rule 164(1) EPC dated Oct. 30, 2023, corresponding to European Patent Application No. 20924433.4.
Samsung: "Policy update on DNN replacement", 3GPP Draft; SP-200080, 3rd Generation Partnership Project (3GPP), Mobile Competence Centre ; 650, Route Des Lucioles ; F-06921 Sophia-Antipolis Cedex ; FRANCE vol. SA WG2, No. Elbonia; Feb. 24, 2020-Feb. 27, 2020.Mar. 11, 2020 (Mar. 11, 2020).
Second Office Action dated Feb. 8, 2024 corresponding to Chinese Patent Application No. 202080098328.5, with English summary thereof.

* cited by examiner

DYNAMICAL CHANGE IN ACCESS AND MOBILITY POLICY

FIELD

Embodiments of the present disclosure generally relate to communication techniques, and more particularly, to methods, devices and computer readable medium for dynamical changes in access and mobility policies.

BACKGROUND

With development of communication systems, more and more technologies have been proposed. For example, in the third generation partnership project (3GPP), some core network entities may receive connection related information and may be responsible for handling connection and mobility management tasks while other core network entities may receive session related information and may be responsible for handling session management tasks. Polies for managing connection and mobility may be changed based on different network conditions.

SUMMARY

Generally, embodiments of the present disclosure relate to a method for dynamical changes in access and mobility policies and corresponding entities/devices.

In a first aspect, there is provided a method. The method comprises in accordance with a determination that a traffic change occurs for an application on a terminal device, obtaining, at a first entity, information indicating at least one of an access parameter or a mobility parameter related to the traffic change. The method also comprise configuring at least one of an access setting or a mobility setting of the terminal device based on the traffic change and the obtained information.

In a second aspect, there is provided a method. The method comprises sending, at a second entity and to a third entity, a discovery request for discovering a first entity capable of managing at least one of an access setting or a mobility setting of an application for a terminal device. The method further comprises receiving a discovery response or a notification indicating an identity of the first entity capable of managing at least one of the access setting or the mobility setting of the application for the terminal device. The method also comprises in accordance with a determination that a traffic change occurs in the application, sending an update request to the first entity capable of managing at least one of the access setting or the mobility setting of the application for the terminal device for updating at least one of the access setting or the mobility setting of the terminal device.

In a third aspect there is provided a method. The method comprises receiving, at a third entity, a register request indicating an identity of a first entity a capable of managing at least one of an access setting or a mobility setting of an application. The method also comprises receiving from a second entity a discovery request for discovering the first entity capable of managing at least one of an access setting or a mobility setting of the application. The method further comprises sending to the second entity a discovery response or a notification indicating an identity of the first entity.

In a fourth aspect there is provided a method. The method comprises receiving, at a fourth entity and from a first entity or a second entity, a subscribe request for discovering a fourth entity capable of having a traffic change in an application on a terminal device being detected. The method also comprises in response to having the traffic change being detected, sending to the first entity or the second entity an indication concerning the detection of the traffic change in the application.

In a fifth aspect, there is provided a first entity. The first entity comprises at least one processor; and at least one memory including computer program codes; the at least one memory and the computer program codes are configured to, with the at least one processor, cause the first entity to in accordance with a determination that a traffic change occurs for an application on a terminal device, obtain information indicating at least one of an access parameter or a mobility parameter related to the traffic change. The first entity is further caused to configure at least one of an access setting or a mobility setting of the terminal device based on the traffic change and the obtained information.

In a sixth aspect, there is provided a second entity. The second entity comprises at least one processor; and at least one memory including computer program codes; the at least one memory and the computer program codes are configured to, with the at least one processor, cause the second entity to send to a third entity a discovery request for discovering a first entity capable of managing at least one of an access setting or a mobility setting of an application on a terminal device. The second entity is further caused to receive a discovery response or a notification indicating an identity of the first entity capable of managing at least one of the access setting or the mobility setting of the application for the terminal device. The second entity is also caused to in accordance with a determination that a traffic change occurs in the application, send an update request to the first entity capable of managing at least one of the access setting or the mobility setting of the application for the terminal device for updating at least one of the access setting or the mobility setting of the terminal device.

In a seventh aspect, there is provided a third entity. The third entity comprises at least one processor; and at least one memory including computer program codes; the at least one memory and the computer program codes are configured to, with the at least one processor, cause the third entity to receive from a first entity a register request indicating an identity of the first entity capable of managing at least one of an access setting or a mobility setting of an application on a terminal device. The third entity is further caused to receive, from a second entity, a discovery request for discovering the first entity capable of managing at least one of an access setting or a mobility setting of the application. The third entity is also caused to send to the second entity a discovery response or a notification indicating an identity of the first entity.

In an eighth aspect, there is provided a fourth entity. The fourth entity comprises at least one processor; and at least one memory including computer program codes; the at least one memory and the computer program codes are configured to, with the at least one processor, cause the fourth entity to receive from a first entity or a second entity a subscribe request for discovering a fourth entity capable of having a traffic change in an application on a terminal device being detected. The fourth entity is further caused to in response to having the traffic change being detected, send to the first entity or the second entity an indication concerning the detection of the traffic change in the application.

In a ninth aspect, there is provided an apparatus. The apparatus comprises means for in accordance with a determination that a traffic change occurs for an application on a terminal device, obtaining, at a first entity, information indicating at least one of an access parameter or a mobility parameter related to the traffic change; and means for means for configuring at least one of an access setting or a mobility setting of the terminal device based on the traffic change and the obtained information.

In a tenth aspect, there is provided an apparatus. The apparatus comprises means for sending, at a second entity and to a third entity, a discovery request for discovering a first entity capable of managing at least one of an access setting or a mobility setting of an application for a terminal device; means for receiving a discovery response or a notification indicating an identity of the first entity capable of managing at least one of the access setting or the mobility setting of the application for the terminal device; and means for in accordance with a determination that a traffic change occurs in the application, sending an update request to the first entity capable of managing at least one of the access setting or the mobility setting of the application for the terminal device for updating at least one of the access setting or the mobility setting of the terminal device.

In an eleventh aspect, there is provided an apparatus. The apparatus comprises means for receiving, at a third entity and from a first entity, a register request indicating an identity of the first entity a capable of managing at least one of an access setting or a mobility setting of an application on a terminal device; means for receiving from a second entity a discovery request for discovering the first entity capable of managing at least one of an access setting or a mobility setting of the application; and means for sending to the second entity a discovery response or a notification indicating an identity of the first entity.

In a twelfth aspect, there is provided an apparatus. The apparatus comprises means for receiving, at a fourth entity and from a first entity or a second entity, a subscribe request for discovering a fourth entity capable of having a traffic change in an application on a terminal device being detected; and means for in response to having the traffic change being detected, sending to the first entity or the second entity an indication concerning the detection of the traffic change in the application.

In a thirteenth aspect, there is provided a computer readable medium comprising program instructions for causing an apparatus to perform at least the method according to the above first, second, third or fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
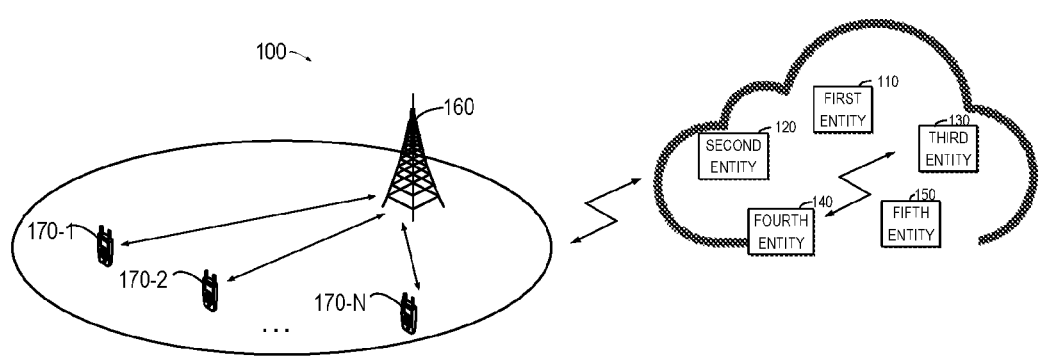
FIG. 1 illustrates a schematic diagram of a communication system according to according to some example embodiments of the present disclosure.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.55G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network entity" refers to a node in a communication network via which a terminal device accesses the network and receives services therefrom. The network entity may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, Integrated Access and Backhaul (IAB) node, a low power node such as a femto, a pico, and so forth, depending on the applied terminology and technology or to any platform that can host Core Network Functions such as AMF, SMF, PCF, AF, BSF defined in 3GPP 5G Core Systems or equivalent functions or services. The mechanism described in this paper can apply regardless of the access technology/technologies used by the terminal device to access to the network: these access technology/technologies may for example correspond to radio technologies defined by 3GPP but also to technologies defined by IEEE (Ethernet, WiFi, etc. . . . ), to wireline access (DSL, any form of PON) or to any mechanism used to connect to a Core network.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, polies for managing connection and mobility may be changed based on different network conditions. The 3GPP Policy Control architecture supports deployments where the policy controller of Access and Mobility Function (AMF) (may also be called Policy Control Function-Access and Mobility Function (PCF-AM)) is different from the policy controller of Session Management Function (SMF) (may also be called PCF-SM). For a given terminal device at a given time in a public land mobile network (PLMN), there is one single PCF-AM while there may be multiple PCF-SMs as the terminal device may have requested multiple Protocol Data Unit (PDU) Sessions i.e., multiple data services.

The PCF-SM may register itself for a user equipment (UE) address (for example, IP, Ethernet or medium access control (MAC) address). The PCF-SM may also register Data Network Name (DNN) and Single-Network Slice Selection Assistance Information (S-NSSAI) in a BSF (Binding Support Function) that acts as registry for PCF-SM.

Policy control and charging has been extended to support access and mobility related policy control in 5G. The access and mobility policy control may encompass the management of: service area restrictions, the RFSP Index (RAT/Frequency Selection Priority), UE-AMBR (Aggregate Maximum Bit Rate), and SMF selection.

The management of the RFSP Index may enable the PCF to modify the RFSP Index transferred by the AMF to the radio access network (RAN) in order to perform radio resource management functionality. The subscribed RSFP Index may be further adjusted by the PCF based on operator policies at any time. The RSFP may also be changed based on event triggers defined as Policy Control Request Triggers relevant for AMF and 3GPP access type.

According to conventional technologies, it provides solutions for the following use case scenarios and service requirements (including for deployments where the PCF-AM and the PCF-SM are distinct): frequency or Radio Access Technology (RAT) steering based on applications in use and allowed TAI for temporary expansion of coverage.

For frequency steering based on applications in use, operators may wish to modify the RFSP Index (RAT/Frequency Selection Priority) based on policies that may e.g. take into consideration accumulated traffic usage, load level information per network slice instance or per PDU Session and the like, which includes cases where the PCF-AM and PCF-SM(s) are from different manufacturers where a standard solution is needed.

A typical consumer service may correspond to users generally watching videos, browsing the internet and the default frequency prioritisation policy in the RAN will be designed for these usages. However, on occasion, the mobile data service may also be used for a service requiring different RAT/Frequency Selection, for example, an interactive video session service.

The operator's default frequency prioritisation may no longer be suitable and it may be needed to "push" the UE to a higher frequency that is capable of supporting the upgraded bitrate for the interactive video service. Therefore, there is need for a means for dynamically changing the RFSP index in the AM policy when the data service of the user is now carrying some application/service like interactive video. This change could be triggered in a number of ways. For example, the user manually activates an interactive video prioritisation pack that improves their video service for a fixed duration. This could be useful if they have an important video call that they want to be as seamless as possible. In some embodiments, the application is automatically detected by a Deep Packet Inspection type capability. In other embodiments, a third-party application such as an interactive video provider signals to the network that a call has commenced.

For allowed tracking area identity (TAI) for temporary expansion of coverage, many operators differentiate based on coverage. To maintain this differentiation, they restrict which TAIs a service can use for wholesale customers, for low cost subsidiary brands and/or for lower tier plans. However, an operator may want to provide a service offer that allows an customer to buy a pass that lifts or modifies these restrictions for a restricted timeframe. For example, a customer pays a fee to have access to the full range of coverage for a week, knowing that they are travelling on holidays to an area that is outside of their normally allowed coverage area as defined by the allowed TAI list.

The above 2 use case scenarios require AM policies of a UE can be dynamically modified for a specific Application. In order to support the above scenarios, it needs to resolve the following issues: (1) how to trigger the change of AMF policy for a UE, a group of UE or all UE for a DNN or S-NSSAI; (2) how a PCF-AM may be aware of the start and stop of an application traffic that may impact the update of the AM policy; and (3) how to resolve the conflicts when multiple applications are on-going simultaneously with different requirements on the same AM policy.

There may be one way to resolve the above issue (2), which is to collocate PCF-AM and PCF-SM, i.e. selecting same the PCF for both AMF and SMF but this can't apply when the PCF-AM and the PCF-SM are in different slices and/or from different manufacturers. There's no standard solution for the above issues (1) and (3).

While the collocation solution may still be valid for some specific deployment scenarios, it restricts the flexible deployment of PCF if network slicing has to be considered, i.e. deploying PCF-AM serving multiple slices and multiple slice specific (hence different) PCF-SMs. Hence the solution shall assume selecting different PCF-AM for a UE and PCF-SM(s) for the PDU session(s) of the UE. Thus, new mechanism for changing AM policies is needed.

In order to solve at least part of the above problems, embodiments of the present disclosure propose a solution for dynamically change AM policies. According to embodiments, an AF entity can request the AM entity to modify AM policies for a terminal device after the discovery of the PCF-AM. Alternatively, a PCF-AM entity obtains AM policy from a User Data Repository that link traffic of an application on a PDU Session towards to PCF-AM policies and configure the AM policy accordingly i.e. based on a detection of traffic change. In this way, the AM setting can be dynamically changed based on the traffic change in the application.

FIG. 1 illustrates a schematic diagram of a communication system in which embodiments of the present disclosure can be implemented. The communication system 100, which is a part of a communication network, comprises one or more core network entities, for example, a first entity 110, a second entity 120, a third entity 130, a fourth entity 140 or a fifth entity 150. It should be noted that the number of core network entities is only an example not limitation. The first entity 110 may be an entity capable of managing access and mobility, for example, and AM/PCF-AM entity. The second entity 120 may be an AF entity. The third entity 130 may be an entity capable of storing binding applications and instances, for example, a BSF entity. The fourth entity 140 may be an entity capable of having traffic changes in applications being detected. The fifth entity 150 may be an entity capable of storing policy data, for example, an UDR. The core network entities can communicate with each other via certain interfaces. The term "entity" used herein may refer to a physical device or a virtualized network function module.

The communication system 100 may also a device 170-1, a device 170-2, . . . , a device 170-N, which can be collectively referred to as "terminal device(s) 170." The communication system 100 further comprises a network device 160. It is to be understood that the number of devices and cells shown in FIG. 1 is given for the purpose of illustration without suggesting any limitations. The communication system 100 may comprise any suitable number of devices and cells. The number of devices and entities shown in FIG. 1 is given for the purpose of illustration without suggesting any limitations.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple Access (OFDMA) and/or any other technologies currently known or to be developed in the future.

Figure 2:
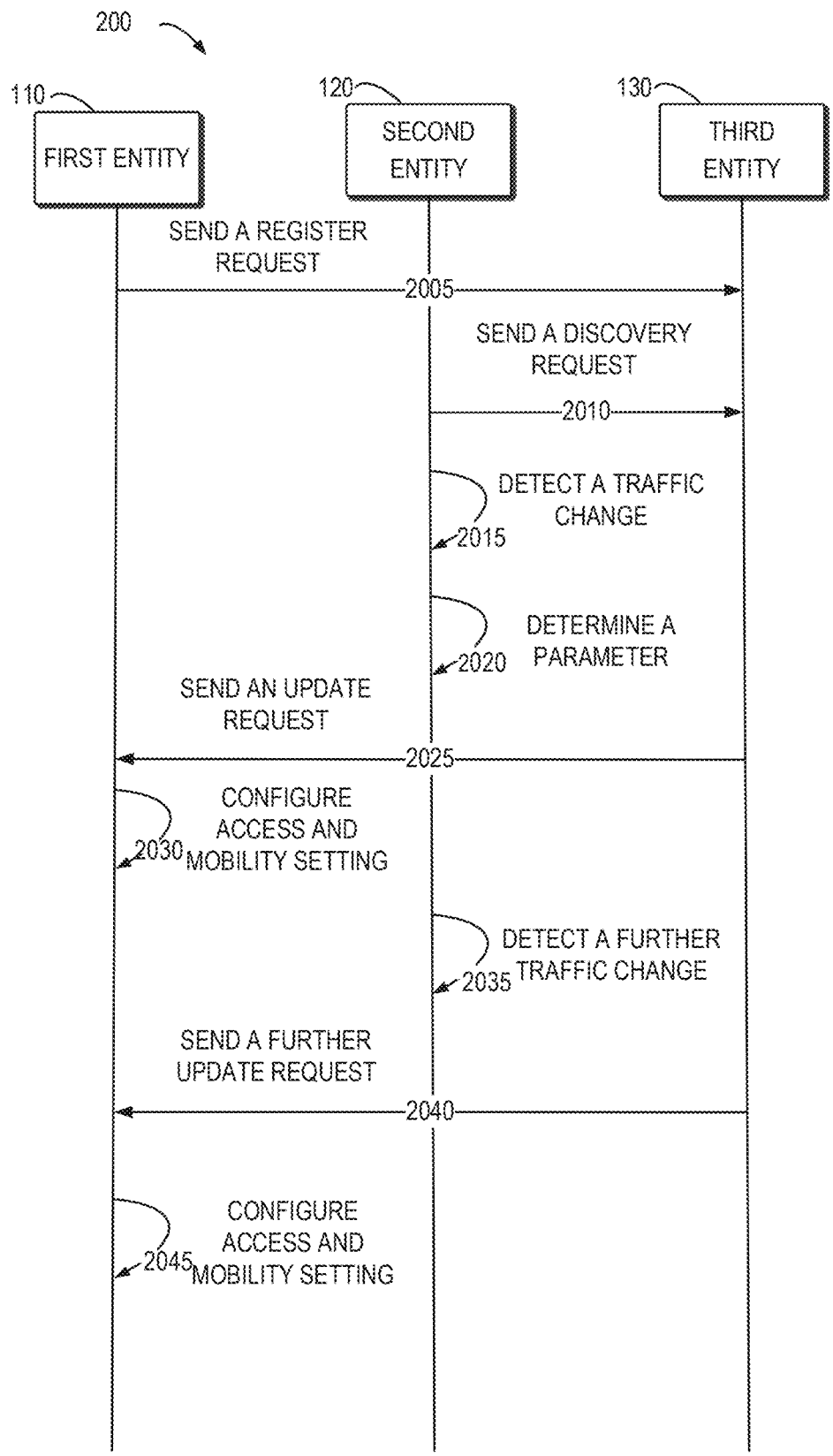
FIG. 2 illustrates a schematic diagram of interactions between entities according to according to some example embodiments of the present disclosure.

FIG. 2 illustrates a schematic diagram of interactions 200 among entities in accordance with some example embodiments of the present disclosure. The interactions 200 may be implemented at any suitable entities. Only for the purpose of illustrations, the interactions 200 are described to be implemented at the first entity 110, the second entity 120 and the third entity 130. It should be noted that the interactions 200 are only examples not limitations.

The first entity 110 sends 2005 a register request to the third entity 130. The first entity 110 may be able to manage the access setting and/or the mobility setting of the application on the terminal device (for example, the terminal device 170-1). The registration may take place as a follow up of AM policy association establishment. By way of example, the first entity 110 may reuse Nbsf_Management_Register operation for the registration. The register request may comprise an identity of the first entity 110. For example, the first entity 110 may provide one or more of the followings: Subscription Permanent Identifier (SUPI) and Generic Public Subscription Identifier (GPSI) and its identity but may not provide UE address. In some embodiments, there may be a new parameter in the register request which indicate that the first entity 110 is an AM entity and thus the registration does not refer to the support of a PDU Session to a specific DNN.

The second entity 120 sends 2010 a discovery request or subscription to the third entity 130 to discover the first entity 110. For example, the second entity 120 may discover the first entity 110 based on SUPI/GPSI using BSF Nbsf_Management_Discovery service operation with the first entity 110 as a discovery parameter. In other embodiments, the second entity 120 may discover the first entity 110 using a Nbsf_Management_subscribe/notify operation. The third entity 130 may also send a discovery response or a notification (Nbsf_Management_notify) to the second entity 120. The discovery response or notification may comprise an identity of the third entity 130.

The second entity 120 detects 2015 a traffic change for an application on the terminal device 170-1. For example, the second entity 120 may detect a start of traffic in the application. Alternatively, the traffic change may comprise a stop of traffic in the application. In other embodiments, the second entity 120 may detect that the traffic in the application dramatically increases or decreases. In addition, the second entity 120 may detect the traffic change when the user has subscribed to a temporary "boost plan."

The second entity 120 determines 2020 one or more of an access parameter or a mobility parameter related to the traffic change. Only as an example, if the second entity 120 detects the start of traffic in a video application, the second entity 120 may determine that the video application may need priority for access to 5G network or access to specific radio resources. The access parameter may indicate priority for access to the 5G network or access to specific radio resources.

The second entity 120 sends 2025 an update request to the first entity 110 for updating one or more of an access setting or a mobility setting of the application. In some embodiments, the update request may comprise the determined access parameter and/or mobility parameter related to the traffic change. In other embodiments, the update request may also comprise a timer for the updated settings. In this way, the first entity 110 can be aware of traffic change.

The first entity 110 configures 2030 the access setting and/or the mobility setting of the application based on the update request. For example, the first entity 110 may update the RFSP of the terminal device if the application needs more traffic capabilities e.g. via access to specific radio resources. Alternatively, the first entity 110 may update the TAI for the application. Therefore, the access setting and/or the mobility setting can be dynamically changed considering the input from the second entity 120, i.e., AF entity.

In some embodiments, the second entity 120 may detect 2035 a further traffic change in the application. For example, the second entity 120 may detect a stop/start of the traffic in the application. The second entity 120 may further determine a further access parameter or a further mobility parameter related to the further traffic change. Only as an example, if the second entity 120 detects the stop of traffic in the video application, the second entity 120 may determine that there is no need to accessing 5G network via access to specific radio resources. The further access parameter may indicate to access a long-term evolution network.

In this situation, the second entity may send 2040 a further update request to the first entity 110 for the SUPI/GPSI. The further request comprises the determined further access parameter or a further mobility parameter related to the further traffic change. The first entity 110 may further configure 2045 the access setting and/or the mobility setting of the application based on the further update request. For example, the first entity 110 may go back to the previous access setting and/or the mobility setting. As mentioned above, the update request may comprise the timer. In such situation, the first entity 110 may further configure 2045 the setting by going back to the previous setting after the timer expired.

Figure 3:
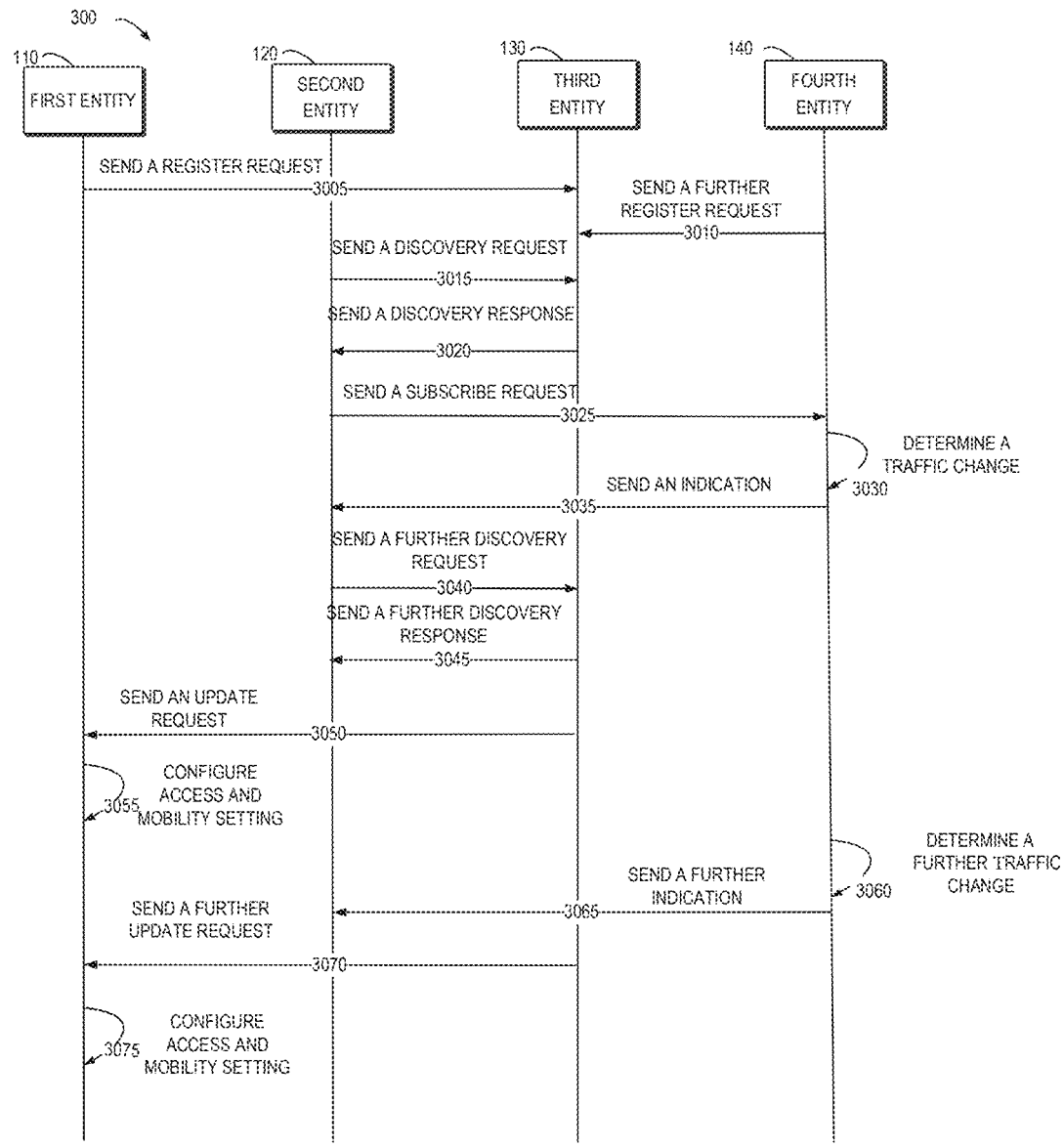
FIG. 3 illustrates a schematic diagram of interactions between entities according to according to some example embodiments of the present disclosure.

FIG. 3 illustrates a schematic diagram of interactions 300 among entities in accordance with some example embodiments of the present disclosure. The interactions 300 may be implemented at any suitable entities. Only for the purpose of illustrations, the interactions 200 are described to be implemented at the first entity 110, the second entity 120, the third entity 130, and the fourth entity 140. It should be noted that the interactions 300 are only examples not limitations.

The first entity 110 sends 3005 a register request to the third entity 130. The registration may take place as a follow up of AM policy association establishment. For example, the first entity 110 may reuse Nbsf_Management_Register operation for the registration. The first entity 110 may provide one or more of the followings: SUPI, GPSI and its identity but may not provide UE address. In some embodiments, there may be a new parameter in the register request which indicate that the first entity 110 is an AM entity and thus the registration does not refer to the support of a PDU Session to a specific DNN. In some embodiments, the registration may take place during AM policy association establishment or modification.

The fourth entity 140 sends 3010 a further register request to the third entity 130. The further register request may comprise an identity of the fourth entity 140. In some embodiments, the further registration may happen during SM policy association establishment indicating the SUPI. For example, the further registration may take place as part of a PDU Session establishment.

The second entity 120 sends 3015 a discovery request to the third entity 130 to discover the fourth entity 140 which is capable of having a traffic change in an application being detected. For example, the discovery parameter may comprise SUPI/GPSI. Alternatively, the discovery parameter may comprise DNN or S-NSSAI. The discovery request may be using a Nbsf_Management_Discovery operation. In other embodiments, discovery request may be using a Nbsf_Management_subscribe/notify operation. The third entity 130 sends 3020 a discovery response or notification to the second entity 120. The discovery response may indicate the identity of the fourth entity 140.

The second entity 120 sends 3025 a subscribe request to the fourth entity 140 for detection of traffic of interest. For example, the second entity 120 may transmit a Npcf_PolicyAuthorization_Subscribe for the SUPI/GPSI to the fourth entity 140. In some embodiments, the second entity 120 may provide an application identity or one or more of service data flow (SDF) filters to identify the traffic of interest.

The fourth entity 140 detects 3030 a traffic change according to the request in 3025. For example, the traffic change may comprise a start of traffic in the application. Alternatively, the traffic change may comprise a stop of traffic in the application. In other embodiments, the traffic change may comprise t that the traffic in the application dramatically increases or decreases. In addition, the traffic change can be detected when the user has subscribed to a temporary "boost plan." The traffic change may be detected by a user plane function (UPF) entity. For example, if the traffic change is detected by the UPF and the traffic change can be reported to the fourth entity 140 via SMF, the fourth entity 140 may determine that the traffic change occurred.

The fourth entity 140 sends 3035 to the second entity 120 an indication concerning the detection of the traffic change. In an example embodiment, the fourth entity 140 may transmit Npcf_PolicyAuthorization_Notify which may comprise the indication.

The second entity 120 sends 3040 a further discovery request to the third entity 130 to discover the first entity 110. For example, the second entity 120 may discover the first entity 110 based on SUPI/GPSI using BSF Nbsf_Management_Discovery service operation with the first entity 110 as a discovery parameter. In other embodiments, the second entity 120 may discover the first entity 110 using a Nbsf_Management_subscribe/notify operation. The third entity 130 may also send 3045 a further discovery response or notification to the second entity 120. The further discovery response or notification may comprise an identity of the first entity 110.

The second entity 120 sends 3050 an update request to the first entity 110 for updating one or more of an access setting or a mobility setting of the application. In some embodiments, the update request may comprise the determined access parameter and/or mobility parameter related to the traffic change. In other embodiments, the update request may also comprise a timer for the updated settings. In this way, the first entity 110 can be aware of traffic change.

The first entity 110 configures 3035 the access setting and/or the mobility setting of the application. For example, the first entity 110 may update the RFSP of the terminal device 170-1 if the application needs more traffic capabilities e.g. via access to specific radio resources. Alternatively, the first entity 110 may update the TAI for the application. Therefore, the access setting and/or the mobility setting can be dynamically changed based on the traffic change in the application.

In some embodiments, the fourth entity 140 may determine 3060 a further traffic change in the application. For example, the fourth entity 140 may determine a stop/start of the traffic in the application. Similarly, the further detection of the traffic change can be detected by the UDR or the first entity 110. The fourth entity 140 may be notified with the further detection of the traffic change. The fourth entity 140 may send 3065 a further indication concerning the further traffic change. The second entity 120 may further determine a further access parameter or a further mobility parameter related to the further traffic change. Only as an example, if the stop of traffic in the video application is detected, the second entity 120 may determine that there is no need to accessing 5G network via access to specific radio resources. The further access parameter may indicate to access a long-term evolution network.

In this situation, the second entity may send 3070 a further update request to the first entity 110 for the SUPI/GPSI. The further request comprise the determined further access parameter or a further mobility parameter related to the further traffic change. The first entity 110 may further configure 3075 the access setting and/or the mobility setting of the application based on the further update request. For example, the first entity 110 may go back to the previous access setting and/or the mobility setting. As mentioned above, the update request may comprise the timer. In such situation, the first entity 110 may further configure 2045 the setting by going back to the previous setting after the timer expired.

Figure 4:
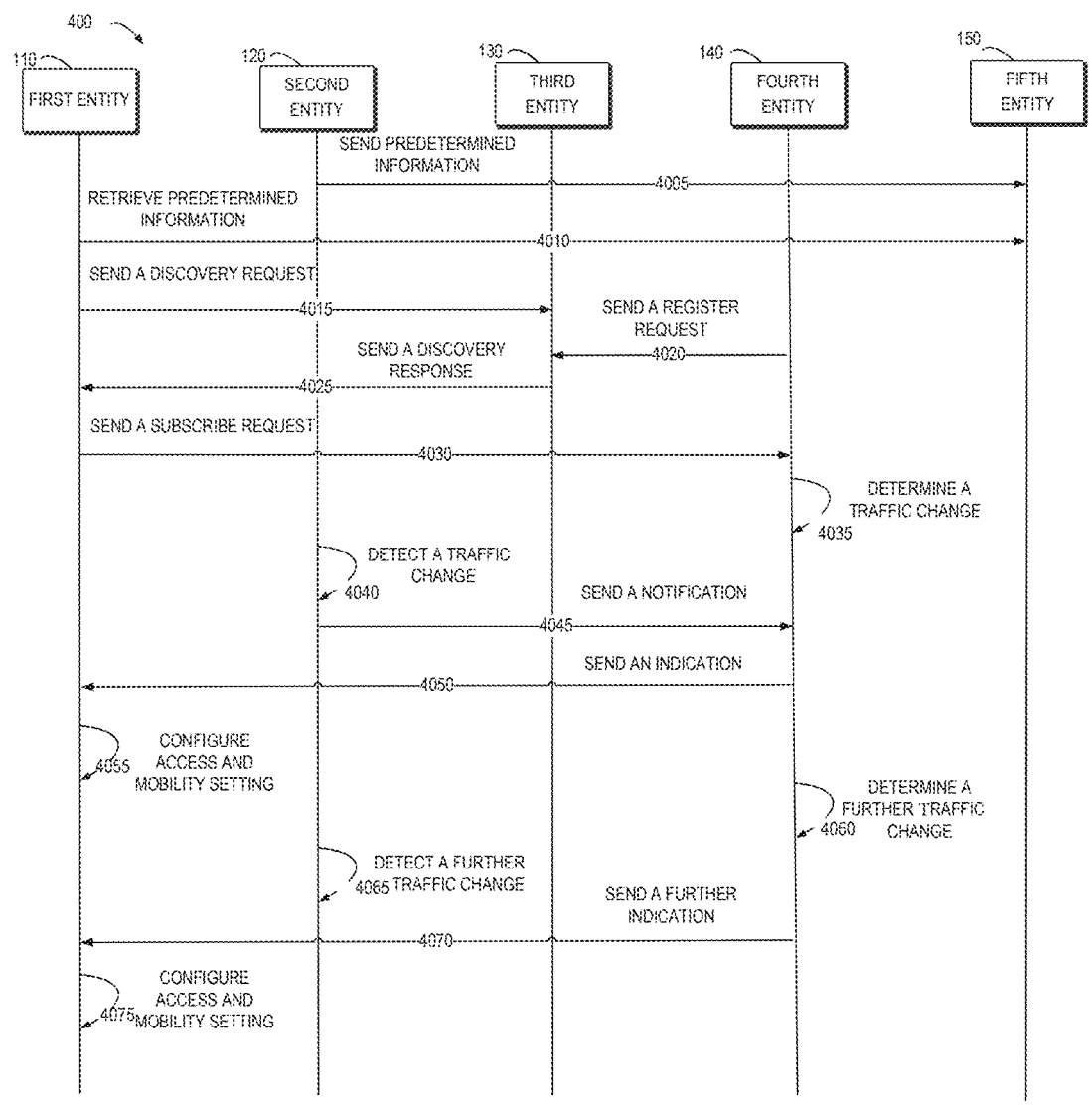
FIG. 4 illustrates a schematic diagram of interactions between entities according to according to some example embodiments of the present disclosure.

FIG. 4 illustrates a schematic diagram of interactions 400 among entities in accordance with some example embodiments of the present disclosure. The interactions 400 may be implemented at any suitable entities. Only for the purpose of illustrations, the interactions 400 are described to be implemented at the first entity 110, the second entity 120, the third entity 130, the fourth entity 140 or the fifth entity 150. It should be noted that the interactions 400 are only examples not limitations.

The second entity 120 sends 4005 information related to AM policies to the fifth entity 150. The information may comprise identities of one or more terminal devices (for example, SUPI/GPSI). Alternatively, predetermined information may comprise an identity of a group of terminal devices. The AM policy may apply to the terminal devices indicated in the predetermined information. The information may also comprise an indication of how to detect the traffic of the applications on the terminal devices.

In some embodiments, the information may also comprise an indication of target application traffic. For example, it may comprise DNN, S-NSSAI and a SDF template (for example, an application identity or SDF filter(s)). The predetermined information to detect traffic of the application may impact the AM policy of the terminal device. It may be provided to the fourth entity 140 for application traffic detection. In this way, it prevents the first entity 110 from subscribing to the third entity 130 for all SUPI and all DNN and S-NSSAI on the fourth entity 140 serving the PDU session of the terminal devices.

In addition, requirements of the AM policy (for example, RFSP value) may also be included in the predetermined information. Alternatively, the predetermined information may comprise priorities of the AM policy. This is to prevent conflict between multiple applications that may refer to different conflicting policies.

The information in the fifth entity 150 may be a per UE policy, a per IMSI group policy or a policy valid for all UE and may be restricted for a given DNN and/or S-NSSAI. This information may be configured via the NEF when it targets more than one terminal device. If the second entity 130 associates the predetermined information with external identities (for example, GPSI, external Group Id), this is translated into SUPI or an internal Group identity before being written into the fifth entity 150.

The first entity 110 may retrieve 4010 the information from the fifth entity 150. In some embodiments, the first entity 110 may retrieve from the fifth entity 150 the predetermined information for an individual SUPI during AM policy association establishment. The first entity 110 may get the predetermined information subscription policy data via a notification from the fifth entity 150.

The first entity 110 sends 4015 a discovery request to the third entity 130 for discovering one or more fourth entities 140 capable of having a traffic change in an application being detected. For example, the discovery parameter may comprise SUPI/GPSI. Alternatively, the discovery parameter may comprise DNN or S-NSSAI. The discovery request may be using a Nbsf_Management_Discovery operation. In other embodiments, discovery request may be using a Nbsf_Management_subscribe/notify operation.

The first entity 110 may subscribe to the third entity 130 on the registration of the fourth entity 140 for one of the SUPI, DNN and S-NSSAI associated with the AM policy. The first entity 110 may subscribe to the third entity 130 on the registration of multiple fourth entities 140 serving the terminal device if the AM policies refer to multiple different PDU sessions established for the terminal device 170.

The fourth entity 140 sends 4020 a register request to the third entity 130. The register request may indicate an identity of the fourth entity 140. The registration may happen during SM policy association establishment indicating the SUPI. The registration may take place as part of a PDU session establishment.

The third entity 130 sends 4025 a discovery response or notification to the first entity 110. The discovery response or notification may comprise the identity of the fourth entity 140.

The first entity 110 sends 4030 a subscribe request to the fourth entity 140. For example, the first entity 110 may transmit a Npcf_PolicyAuthorization_Subscribe for the SUPI/GPSI to the fourth entity 140. In some embodiments, the first entity 110 may provide an application identity or one or more of SDF filters.

The fourth entity 140 determines 4035 a traffic change in an application on the terminal device 170-1. For example, the traffic change may comprise a start of traffic in the application. Alternatively, the traffic change may comprise a stop of traffic in the application. In other embodiments, the traffic change may comprise that the traffic in the application dramatically increases or decreases. In addition, the f traffic change can be detected when the user has subscribed to a temporary "boost plan." The traffic change may be detected by a user plane function (UPF) entity.

In some embodiments, the traffic change of the application may be detected 4040 by the second entity 120. The second entity 120 may notify 4045 the traffic change of the application to the fourth entity 140, for example, by the AF request on AF authorization. Alternatively, if the traffic change is detected by the UPF, the UPF may report the traffic change to the fourth entity 140 via SME The fourth entity 140 sends 4050 an indication concerning the traffic change in the application.

The first entity 110 configures 4055 the access setting and/or the mobility setting of the application based on the retrieved predetermined information. For example, the first entity 110 may update the RFSP of the terminal device 170-1 if the application needs more traffic capabilities e.g. via access to specific radio resources. Alternatively, the first entity 110 may update the TAI for the application. Therefore, the access setting and/or the mobility setting can be dynamically changed considering the input from the second entity 120, i.e., AF entity.

In some embodiments, the fourth entity 140 may determines 4060 a further traffic change in the application. For example, the further traffic change may comprise a stop/start of the traffic in the application. In some embodiments, a further traffic change of the application may be detected 4065 by the second entity 120. The second entity 120 may notify the traffic change of the application to the fourth entity 140.

The fourth entity 140 may send 4070 a further indication concerning the further traffic change. The second entity 120 may further determine a further access parameter or a further mobility parameter related to the further traffic change. Only as an example, if the stop of traffic in the video application is detected, the second entity 120 may determine that there is no need to accessing 5G network. The further access parameter may indicate to access a long-term evolution network.

The first entity 110 may further configure 4075 the access setting and/or the mobility setting of the application based on the retrieved predetermined information. For example, the first entity 110 may go back to the previous access setting and/or the mobility setting. As mentioned above, the update request may comprise the timer. In such situation, the first entity 110 may further configure 2045 the setting by going back to the previous setting after the timer expired.

Figure 5:
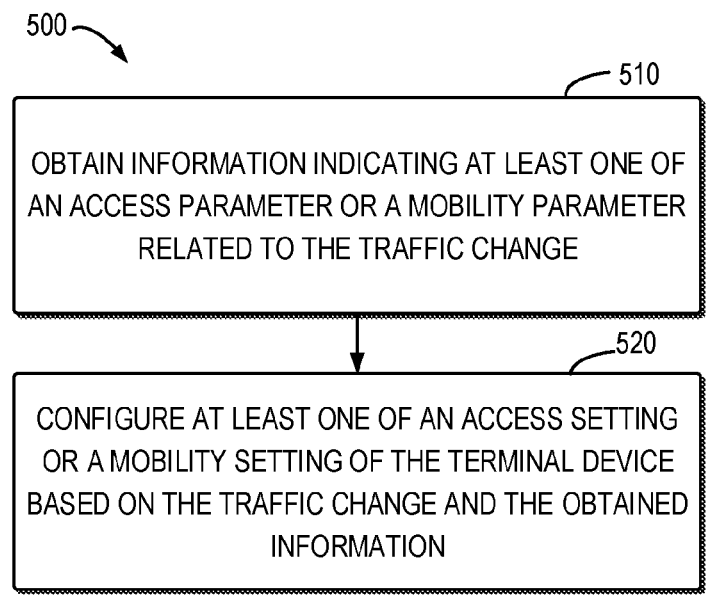
FIG. 5 illustrates a flow chart of a method according to some example embodiments of the present disclosure.

FIG. 5 illustrates a flow chart of method 500 according to embodiments of the present disclosure. The method 500 can be implemented at any suitable entities. For example, the method may be implemented at the first entity 110.

At block 510, the first entity 110 obtains information indicating at least one of an access parameter or a mobility parameter related to the traffic change if a traffic change occurs in an application on the terminal device 170. In some embodiments, the first entity 110 may receive an update request for updating one or more of an access setting or a mobility setting of the application. In some embodiments, the update request may comprise the determined access parameter and/or mobility parameter related to the traffic change. In other embodiments, the update request may also comprise a timer for the updated settings. The first entity 110 may extract the an access parameter and/or a mobility parameter from the update request.

Alternatively, the first entity 110 may transmit a discovery request or a notification to the third entity 130 for discovering one or more fourth entities 140 capable of having a traffic change in the application being detected. For example, the discovery parameter may comprise SUPI/GPSI. Alternatively, the discovery parameter may comprise DNN or S-NSSAI. The discovery request may be using a Nbsf_Management_Discovery operation. In other embodiments, discovery request may be using a Nbsf_Management_subscribe/notify operation.

The first entity 110 may receive from the third entity 130 a discovery response or notification indicating the identity of the fourth entity 140. The first entity 110 may transmit a subscribe request to the fourth entity 140. For example, the first entity 110 may transmit a Npcf_PolicyAuthorization_Subscribe for the SUPI/GPSI to the fourth entity 140. In some embodiments, the first entity 110 may prove an application identity or one or more of SDF filters.

In some embodiments, the first entity 110 may send a register request to the third entity 130. The registration may take place as a follow up of AM policy association establishment. By way of example, the first entity 110 may reuse Nbsf_Management_Register operation for the registration. The register request may comprise an identity of the first entity 110. For example, the first entity 110 may provide one or more of the followings: Subscription Permanent Identifier (SUPI) and Generic Public Subscription Identifier (GPSI) and its identity but may not provide UE address. In some embodiments, there may be a new parameter in the register request which indicate that the first entity 110 is an AM entity and thus the registration does not refer to the support of a PDU Session to a specific DNN.

In an example embodiment, the first entity 110 may retrieve the information from the fifth entity 150. In some embodiments, the first entity 110 may retrieve from the fifth entity 150 the predetermined information for an individual SUPI during AM policy association establishment. The first entity 110 may get the predetermined information subscription policy data via a notification from the fifth entity 150. The predetermined information may comprise identities of one or more terminal devices (for example, SUPI/GPSI). Alternatively, predetermined information may comprise an identity of a group of terminal devices. The AM policy may apply to the terminal devices indicated in the predetermined information.

In some embodiments, the information may also comprise an indication of target application traffic. For example, it may comprise DNN, S-NSSAI and a SDF template (for example, an application identity or SDF filter(s)). The information may also comprise an indication of how to detect the traffic of the applications on the terminal devices. The information to detect traffic of the application may impact the AM policy of the terminal device. It may be provided to the fourth entity 140 for application traffic detection. In this way, it prevents the first entity 110 from subscribing to the third entity 130 for all SUPI and all DNN, S-NSSAI on the fourth entity 140 serving the PDU session of the terminal devices.

In addition, requirements of the AM policy (for example, RFSP value) may also be included in the predetermined information. Alternatively, the predetermined information may comprise priorities of the AM policy. This is to prevent conflict between multiple applications that may refer to different conflicting policies.

The predetermined information in the fifth entity 150 may be a per UE policy, a per IMSI group policy or a policy valid for all UE and may be restricted for a given DNN and/or S-NSSAI. This predetermined information may be configured via the NEF when it targets more than one terminal device. If the second entity 130 associates the predetermined information with external identities (for example, GPSI, external Group Id), this is translated into SUPI or an internal Group identity before being written into the fifth entity 150.

At block 520, the first entity 110 configures the access setting and/or the mobility setting of the application based on the update request. For example, the first entity 110 may update the RFSP of the terminal device if the application needs more traffic. Alternatively, the first entity 110 may update the TAI for the application.

The first entity 110 may further configure the access setting and/or the mobility setting of the application based on the further update request. In some embodiments, the first entity 110 may further configure the access setting and/or the mobility setting of the application based on retrieved predetermined information. For example, the first entity 110 may go back to the previous access setting and/or the mobility setting. As mentioned above, the update request may comprise the timer. In such situation, the first entity 110 may further configure 2045 the setting by going back to the previous setting after the timer expired.

Figure 6:
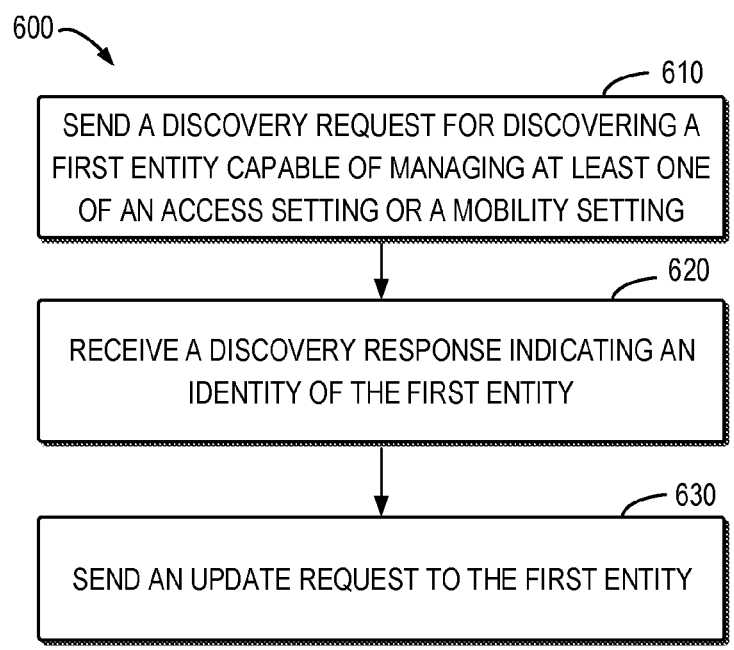
FIG. 6 illustrates a flow chart of a method according to some example embodiments of the present disclosure.

FIG. 6 illustrates a flow chart of method 600. The method 600 can be implemented at any suitable entities. For example, the method may be implemented at the second entity 120.

At block 610, the second entity sends a discovery request for discovering the first entity 110 capable of managing at least one of an access setting or a mobility setting of the application. For example, the second entity 120 may discover the first entity 110 based on SUPI/GPSI using BSF Nbsf_Management_Discovery service operation with the first entity 110 as a discovery parameter. In other embodiments, the second entity 120 may discover the first entity 110 using a Nbsf_Management_subscribe/notify operation. The third entity 130 may also send a discovery response or notification to the second entity 120.

At block 620, the second entity 120 receives a discovery response or notification from the third entity 130. The discovery response or notification may indicate the identity of the first entity 140.

At block 630, the second entity 130 sends an update request to the first entity 110 for updating one or more of an access setting or a mobility setting of the application. In some embodiments, the update request may comprise the determined access parameter and/or mobility parameter related to the traffic change. In other embodiments, the update request may also comprise a timer for the updated settings.

In some embodiments, the second entity 120 may detect a traffic change in an application. For example, the second entity 120 may detect a start of traffic in the application. Alternatively, the traffic change may comprise a stop of traffic in the application. In other embodiments, the second entity 120 may detect that the traffic in the application dramatically increases or decreases. In addition, the second entity 120 may detect the traffic change when the user has subscribed to a temporary "boost plan."

The second entity 120 may determine one or more of an access parameter or a mobility parameter related to the traffic change. Only as an example, if the second entity 120 detects the start of traffic in a video application, the second entity 120 may determine that the video application may need to access 5G network. The access parameter may indicate to access the 5G network.

In some embodiments, the second entity 120 may detect a further traffic change in the application. For example, the second entity 120 may detect a stop/start of the traffic in the application. The second entity 120 may further determine a further access parameter or a further mobility parameter related to the further traffic change. Only as an example, if the second entity 120 detects the stop of traffic in the video application, the second entity 120 may determine that there is no need to accessing 5G network. The further access parameter may indicate to access a long-term evolution network.

In an example embodiment, the second entity 120 may transmit a discovery request to the third entity 130 to discover the fourth entity 140 which is capable of detecting a traffic change in an application. For example, the discovery parameter may comprise SUPI/GPSI. Alternatively, the discovery parameter may comprise DNN or S-NSSAI. The discovery request may be using a Nbsf_Management_Discovery operation. In other embodiments, discovery request may be using a Nbsf_Management_subscribe/notify operation.

The second entity 120 may further send a subscribe request to the fourth entity 140. For example, the second entity 120 may transmit a Npcf_PolicyAuthorization_Subscribe for the SUPI/GPSI to the fourth entity 140. In some embodiments, the second entity 120 may provide an application identity or one or more of service data flow (SDF) filters.

In this situation, the second entity may send a further update request to the first entity 110 for the SUPI/GPSI. The further request comprise the determined further access parameter or a further mobility parameter related to the further traffic change.

Figure 7:
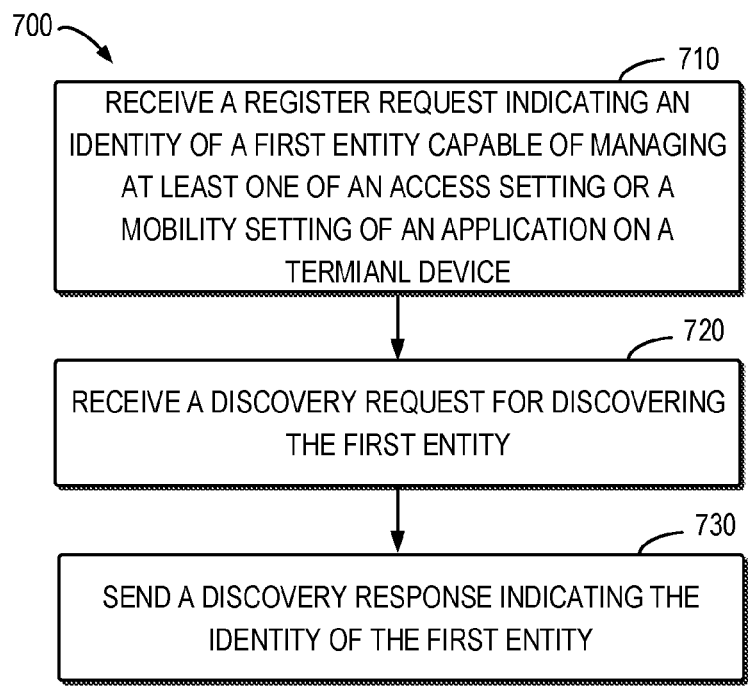
FIG. 7 illustrates a flow chart of a method according to some example embodiments of the present disclosure.

FIG. 7 illustrates a flow chart of method 700. The method 700 can be implemented at any suitable entities. For example, the method may be implemented at the third entity 130.

At block 710, the third entity 130 receives a register request from the first entity 110. The registration may take place as a follow up of AM policy association establishment. For example, the first entity 110 may reuse Nbsf_Management_Register operation for the registration. The first entity 110 may provide one or more of the followings: SUPI, GPSI and its identity but may not provide UE address. In some embodiments, there may be a new parameter in the register request which indicate that the first entity 110 is an AM entity. In some embodiments, the registration may take place during AM policy association establishment or modification.

At block 720, the third entity 130 receives a discovery request or a notification to the third entity 130 to discover the first entity 110. The first entity 110 may be capable of managing AM settings of the application. For example, the discovery parameter may comprise SUPI/GPSI. Alternatively, the discovery parameter may comprise DNN or S-NSSAI. The discovery request may be using a Nbsf_Management_Discovery operation. In other embodiments, discovery request may be using a Nbsf_Management_subscribe/notify operation.

At block 730, the third entity 130 sends the discovery response or notification to the second entity 120. The discovery response or notification may comprise an identity of the first entity 110.

In some embodiments, the third entity 130 may receive a further register request from the fourth entity 140. The further register request may comprise an identity of the fourth entity 140. In some embodiments, the further registration may happen during SM policy association establishment indicating the SUPI. For example, the further registration may take place as part of a PDU Session establishment.

Figure 8:
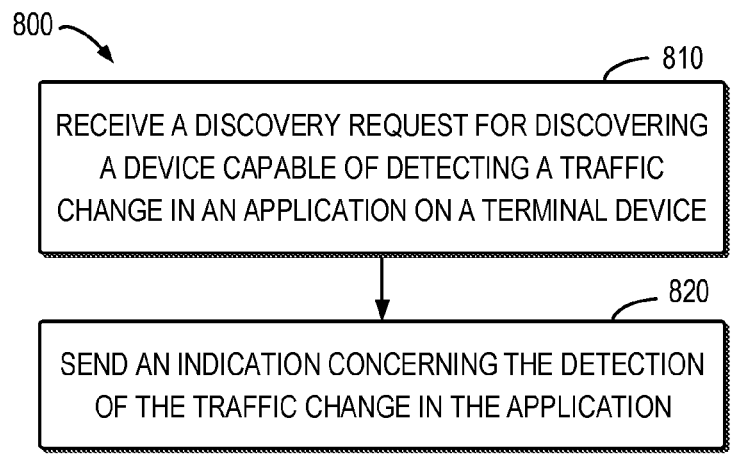
FIG. 8 illustrates a flow chart of a method according to some example embodiments of the present disclosure.

FIG. 8 illustrates a flow chart of method 800. The method 800 can be implemented at any suitable entities. For example, the method may be implemented at the fourth entity 140.

In some embodiments, the fourth entity 140 may transmit a register request to the third entity 130. The register request may comprise an identity of the fourth entity 140. In some embodiments, the registration may happen during SM policy association establishment indicating the SUPI. For example, the registration may take place as part of a PDU Session establishment.

At block 810, the fourth entity 140 receives a subscribe request from the second entity 120. For example, the second entity 120 may transmit a Npcf_PolicyAuthorization_Subscribe for the SUPI/GPSI to the fourth entity 140.

In an example embodiment, the fourth entity 140 may detect a traffic change in an application. For example, the traffic change may comprise a start of traffic in the application. Alternatively, the traffic change may comprise a stop of traffic in the application. In other embodiments, the fourth entity 140 may detect that the traffic in the application dramatically increases or decreases. In addition, the fourth entity 140 may detect the traffic change when the user has subscribed to a temporary "boost plan." The traffic change may be detected by the UPF.

At block 820, the fourth entity 140 sends to the second entity 120 an indication concerning the detection of the traffic change. In some embodiments, the traffic change may be detected by the UPF. After the traffic change has been detected by the UPF, the SMF may report the policy control request trigger to the fourth entity 140 to send the indication concerning the detection of the traffic change. In an example embodiment, the fourth entity 140 may transmit Npcf_PolicyAuthorization_Notify which may comprise the indication.

In some embodiments, the fourth entity 140 may detect a further traffic change in the application. For example, the fourth entity 140 may detect a stop/start of the traffic in the application. The fourth entity 140 may send a further indication concerning the further traffic change.

In embodiments, an apparatus for performing the method 500 (for example, the first entity 110) may comprise respective means for performing the corresponding steps in the method 500. These means may be implemented in any suitable manners. For example, it can be implemented by circuitry or software modules.

In some embodiments, the apparatus comprises means for in accordance with a determination that a traffic change occurs for an application on a terminal device, obtaining, at a first entity, information indicating at least one of an access parameter or a mobility parameter related to the traffic change; and means for configuring at least one of an access setting or a mobility setting of the terminal device based on the traffic change and the obtained information.

In some embodiments, the means for obtaining the information comprises means for receiving from a second entity an update request for updating the at least one of the access setting or the mobility setting of the application; and means for extracting the least one of the access parameter or the mobility parameter from the update request.

In some embodiments, the apparatus further comprises means for sending to a third entity a discovery request for discovering a fourth entity capable of having the traffic change in the application being detected; means for receiving a discovery response or a notification comprising an identity of the discovered fourth entity; means for sending a subscribe request to the discovered fourth entity for detecting the traffic change.

In some embodiments, the means for obtaining the information comprises: means for retrieving from a fifth entity information related to access and mobility policy which is sent from a second entity to the fifth entity, the information comprising one or more of the followings: identities of one or more terminal devices, an indication of how to detect the traffic of one or more applications of the one or more terminal devices, priorities of the one or more applications, one or more requirements of the one or more applications.

In some embodiments, the apparatus further comprises means for sending a register request for binding the terminal device and the application.

In some embodiments, the first entity comprises an Access and Mobility Management device.

In embodiments, an apparatus for performing the method 600 (for example, the second entity 120) may comprise respective means for performing the corresponding steps in the method 600. These means may be implemented in any suitable manners. For example, it can be implemented by circuitry or software modules.

In some embodiments, the apparatus comprises means for sending, at a second entity and to a third entity, a discovery request for discovering a first entity capable of managing at least one of an access setting or a mobility setting of an application for a terminal device; means for receiving a discovery response or notification indicating an identity of the first entity capable of managing at least one of the access setting or the mobility setting of the application for the terminal device; and means for in accordance with a determination that a traffic change occurs in the application, sending an update request to the first entity capable of managing at least one of the access setting or the mobility setting of the application for the terminal device for updating at least one of the access setting or the mobility setting of the terminal device.

In some embodiments, the means for sending the update request comprises means for in response to detecting the traffic change, sending to the first entity the update request indicating at least one of the access parameter or the mobility parameter for the terminal device.

In some embodiments, the apparatus comprises means for sending to the third entity a further discovery request for discovering a fourth entity capable of having the traffic change in the application being detected; and means for receiving from the third entity a further discovery response or notification indicating an identity of the fourth entity capable of having the traffic change in the application being detected.

In some embodiments, the means for sending the update request comprises means for in response to receiving from the fourth entity an indication concerning the detection of the traffic change in the application, sending the update request to the first entity.

In some embodiments, the second entity comprises an Application Function entity.

In embodiments, an apparatus for performing the method 700 (for example, the third entity 130) may comprise respective means for performing the corresponding steps in the method 700. These means may be implemented in any suitable manners. For example, it can be implemented by circuitry or software modules.

In some embodiments, the apparatus comprises means for receiving, at a third entity and from a first entity, a register request indicating an identity of the first entity a capable of managing at least one of an access setting or a mobility setting of an application on a terminal device; means for receiving from a second entity a discovery request for discovering the first entity capable of managing at least one of an access setting or a mobility setting of the application; and means for sending to the second entity a discovery response or notification indicating an identity of the first entity.

In some embodiments, the apparatus further comprises means for receiving from a fourth entity a further register request indicating an identity of the fourth entity capable of having a traffic change in the application being detected; means for receiving from the first entity or the second entity a discovery request for discovering the fourth entity capable of having the traffic change in the application being detected; and means for sending to the first entity or the second entity a discovery response or notification indicating an identity of the fourth entity capable of having a traffic change in the application being detected.

In some embodiments, the third entity comprises a Binding Support Function entity.

In embodiments, an apparatus for performing the method 800 (for example, the fourth entity 140) may comprise respective means for performing the corresponding steps in the method 800. These means may be implemented in any suitable manners. For example, it can be implemented by circuitry or software modules.

In some embodiments, the apparatus comprises means for receiving, at a fourth entity and from a first entity or a second entity, a subscribe request for discovering a fourth entity capable of having a traffic change in an application on a terminal device being detected; and means for in response to having the traffic change being detected, sending to the first entity or the second entity an indication concerning the detection of the traffic change in the application.

In some embodiments, the apparatus further comprises means for sending a register request for binding the terminal device and the application.

In some embodiments, the fourth entity comprise a Policy control Session Management entity.

Figure 9:
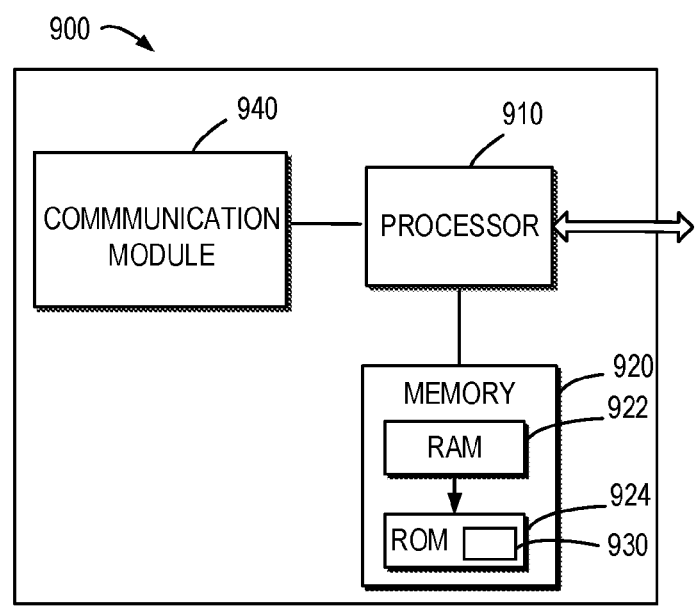
FIG. 9 illustrates a simplified block diagram of an apparatus that is suitable for implementing embodiments of the present disclosure.
Figure 10:
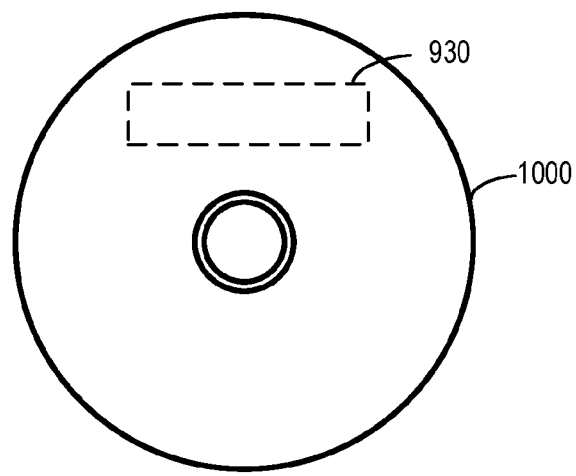
FIG. 10 illustrates a block diagram of an example computer readable medium in accordance with some example embodiments of the present disclosure.

FIG. 9 is a simplified block diagram of a device 900 that is suitable for implementing embodiments of the present disclosure. The device 900 may be provided to implement the communication device, for example the first entity 110, the second entity 120, the third entity 130, the fourth entity 140 as shown in FIG. 1. As shown, the device 900 includes one or more processors 910, one or more memories 920 coupled to the processor 910, and one or more communication modules 940 coupled to the processor 910.

The communication module 940 is for bidirectional communications. The communication module 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 924. The processor 910 may perform any suitable actions and processing by loading the program 930 into the RAM 922.

The embodiments of the present disclosure may be implemented by means of the program 920 so that the device 900 may perform any process of the disclosure as discussed with reference to FIGS. 2 and 7. The embodiments of the present disclosure may also be implemented by hardware or by a combination of software and hardware.

In some example embodiments, the program 930 may be tangibly contained in a computer readable medium which may be included in the device 900 (such as in the memory 520) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 9 shows an example of the computer readable medium 1000 in form of CD or DVD. The computer readable medium has the program 930 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labor between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 900 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or radio access networks. In an embodiment, at least some of the described processes may be performed by the central unit. In another embodiment, the device 500 may be instead comprised in the distributed unit, and at least some of the described processes may be performed by the distributed unit.

In an embodiment, the execution of at least some of the functionalities of the device 900 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 500 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500 and 800 as described above with reference to FIGS. 5 and 8.

Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:
at least one processor; and
at least one memory storing computer program code of a binding support function, the computer program code, when executed by the at least one processor, causing the binding support function to perform operations, the operations comprising:
receiving, from an Access and Mobility Management policy control entity, a register request indicating an identity of the Access and Mobility Management policy control entity, the Access and Mobility Management policy control entity capable of managing at least one of an access setting or a mobility setting of an application on a terminal device;
receiving, from an Application Function entity, a discovery or subscription request for discovering the Access and Mobility Management policy control entity capable of managing the at least one of the access setting or the mobility setting of the application;
sending, to the Application Function entity, a discovery response or notification indicating an identity of the Access and Mobility Management policy control entity;
receiving, from a fourth entity, a further register request indicating an identity of the fourth entity, the fourth entity capable of having a traffic change in the application being detected;
receiving, from the Access and Mobility Management policy control entity or the Application Function entity, a discovery or subscription request for discovering the fourth entity capable of having the traffic change in the application being detected; and
sending, to the Access and Mobility Management policy control entity or the Application Function entity, a discovery response or notification indicating an identity of the fourth entity capable of having the traffic change in the application being detected.

2. A method, comprising:
receiving, at a binding support function, from an Access and Mobility Management policy control entity, a register request indicating an identity of the Access and Mobility Management policy control entity, the Access and Mobility Management policy control entity capable of managing at least one of an access setting or a mobility setting of an application on a terminal device;
receiving, at the binding support function, from an Application Function entity, a discovery or subscription request for discovering the Access and Mobility Management policy control entity, the Access and Mobility Management policy control entity capable of managing at least one of an access setting or a mobility setting of the application;
sending, by the binding support function, to the Application Function entity, a discovery response or notification indicating an identity of the Access and Mobility Management policy control entity
receiving, at the binding support function, from a fourth entity, a further register request indicating an identity of the fourth entity, the fourth entity capable of having a traffic change in the application being detected;
receiving, at the binding support function, from the Access and Mobility Management policy control entity or the Application Function entity, a discovery or subscription request for discovering the fourth entity capable of having the traffic change in the application being detected; and
sending, by the binding support function, to the Access and Mobility Management policy control entity or the Application Function entity, a discovery response or notification indicating an identity of the fourth entity capable of having a traffic change in the application being detected.

3. A non-transitory computer readable storage medium storing program instructions of a binding support function, the program instructions, when executed by an apparatus, causing the apparatus to perform operations, the operations comprising:
receiving, at the binding support function, from an Access and Mobility Management policy control entity, a register request indicating an identity of the Access and Mobility Management policy control entity, the Access and Mobility Management policy control entity capable of managing at least one of an access setting or a mobility setting of an application on a terminal device;
receiving, at the binding support function, from an Application Function entity, a discovery or subscription request for discovering the Access and Mobility Management policy control entity, the Access and Mobility Management policy control entity capable of managing at least one of an access setting or a mobility setting of the application;
sending, by the binding support function, to the Application Function entity, a discovery response or notification indicating an identity of the Access and Mobility Management policy control entity;
receiving, at the binding support function, from a fourth entity, a further register request indicating an identity of the fourth entity, the fourth entity capable of having a traffic change in the application being detected;
receiving, at the binding support function, from the Access and Mobility Management policy control entity or the Application Function entity, a discovery or subscription request for discovering the fourth entity capable of having the traffic change in the application being detected; and sending, by the binding support function, to the Access and Mobility Management policy control entity or the Application Function entity, a discovery response or notification indicating an identity of the fourth entity capable of having a traffic change in the application being detected.

4. The non-transitory computer readable storage medium of claim 3, wherein the fourth entity comprises a Policy control Session Management entity.

5. The apparatus of claim 1, wherein the fourth entity comprises a Policy control Session Management entity.

6. The method of claim 2, wherein the fourth entity comprises a Policy control Session Management entity.

* * * * *